(12) United States Patent
Yamaoka et al.

(10) Patent No.: US 10,892,449 B2
(45) Date of Patent: Jan. 12, 2021

(54) BACKPACK TOOL SYSTEM AND BACKPACK POWER SUPPLY APPARATUS THEREOF

(71) Applicant: Nanjing Chervon Industry Co., Ltd., Nanjing (CN)

(72) Inventors: Toshinari Yamaoka, Nanjing (CN); Kaichao Dai, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 72 days.

(21) Appl. No.: 16/058,049

(22) Filed: Aug. 8, 2018

(65) Prior Publication Data

US 2019/0074489 A1   Mar. 7, 2019

(30) Foreign Application Priority Data

Sep. 6, 2017 (CN) .......................... 2017 1 0796627
Sep. 6, 2017 (CN) .......................... 2017 1 0797545
Sep. 6, 2017 (CN) .................... 2017 2 1141693 U

(51) Int. Cl.
*H01M 2/10* (2006.01)
*A45F 3/04* (2006.01)
(Continued)

(52) U.S. Cl.
CPC .......... *H01M 2/1005* (2013.01); *A01G 20/40* (2018.02); *A45F 3/04* (2013.01); *A45F 3/10* (2013.01);
(Continued)

(58) Field of Classification Search
CPC .. H01M 2/1005; H01M 2220/30; H01M 2/20; A45F 3/10; A45F 3/14; A45F 3/04;
(Continued)

(56) References Cited

U.S. PATENT DOCUMENTS 6,326,766 B1   12/2001  Small
2005/0045686 A1   3/2005  Yeh
(Continued)

FOREIGN PATENT DOCUMENTS

CN   1530049 A     9/2004
CN   203989555 U   12/2014
(Continued)

OTHER PUBLICATIONS

EPO, extended European search report cited in EP patent application No. 18189677.0, dated Apr. 15, 2019, 13 pages.
Husqvarna UK: "Husqvarna Battery Series: Ready When You Are", Youtube, Mar. 10, 2015, 1 page, URL:https://www.youtube.com/watch?v=1f0CxvbUVWE.

*Primary Examiner* — Jared Fureman
*Assistant Examiner* — Emmanuel Dominique
(74) *Attorney, Agent, or Firm* — Greenberg Traurig, LLP

(57) ABSTRACT

A backpack tool system and a backpack power supply apparatus for use with an electric tool. The backpack power supply apparatus includes a battery pack for providing electric energy, a body for carrying the battery pack, and a wearable device connected to the body and wearable by a user to carry the body. The battery pack is detachably connected to the body. The body defines a plane and a height extending in a heightwise direction. The body is at least partially symmetrical about the plane. The wearable device includes a strap, which includes an upper end connected to an upper portion of the body. The upper end of the strap applies a force to the body when the user wears the wearable device. An included angle between a projection of a direction of the force on the plane and the heightwise direction is greater than or equal to 30 degrees and less than or equal to 50 degrees.

29 Claims, 22 Drawing Sheets

(51) Int. Cl.
*A45F 3/12* (2006.01)
*A45F 3/10* (2006.01)
*A01G 20/40* (2018.01)
*A45F 3/14* (2006.01)
*H01M 2/20* (2006.01)
*H02K 7/14* (2006.01)
*A45F 3/00* (2006.01)
*A01G 20/30* (2018.01)

(52) U.S. Cl.
CPC .............. *A45F 3/12* (2013.01); *A45F 3/14* (2013.01); *H01M 2/20* (2013.01); *A01G 20/30* (2018.02); *A45F 2003/003* (2013.01); *A45F 2003/122* (2013.01); *H01M 2220/30* (2013.01); *H02K 7/145* (2013.01)

(58) Field of Classification Search
CPC ............... A45F 3/12; A45F 2003/003; A45F 2003/122; A01G 20/40; A01G 20/30; H02K 7/145
See application file for complete search history.

(56) References Cited

U.S. PATENT DOCUMENTS

| | | | |
|---|---|---|---|
| 2014/0009857 A1* | 1/2014 | Suzuki | H01M 10/6571 361/87 |
| 2015/0194646 A1* | 7/2015 | Yoshinari | H01M 2/1016 429/187 |
| 2016/0020443 A1* | 1/2016 | White | H02J 7/022 318/245 |
| 2016/0260942 A1* | 9/2016 | Wagner | H01M 2/1005 |
| 2016/0345714 A1* | 12/2016 | Yamaoka | E01H 1/0809 |
| 2018/0102706 A1* | 4/2018 | Gao | H02M 3/02 |
| 2018/0184789 A1* | 7/2018 | Bridges | A45F 4/02 |

FOREIGN PATENT DOCUMENTS

| | | | | |
|---|---|---|---|---|
| CN | 105978056 A | * | 9/2016 | ............ A45C 11/24 |
| CN | 107022968 A | | 8/2017 | |
| EP | 3065199 A1 | | 9/2016 | |
| JP | 2016081703 A | | 5/2016 | |
| WO | 2011015769 A1 | | 2/2011 | |

* cited by examiner

BACKPACK TOOL SYSTEM AND BACKPACK POWER SUPPLY APPARATUS THEREOF

CROSS-REFERENCES TO RELATED APPLICATIONS

This application claims the benefit of Chinese patent application No. CN201721141693.1, filed on Sep. 6, 2017, Chinese patent application No. CN201710797545.3, filed on Sep. 6, 2017, and Chinese patent application No. CN201710796627.6, filed on Sep. 6, 2017, the disclosures of which are incorporated herein by reference in their entirety.

TECHNICAL FIELD

The present disclosure relates to a backpack tool system and a backpack power supply apparatus thereof.

BACKGROUND

The working time of an electric tool is limited by its battery capacity. To increase the continuous working time of the electric tool, it is needed to increase the capacity of the battery pack connected to the electric tool, thus increasing the weight of the battery pack. For a hand-held electric tool, the weight that the user's hand needs to bear is increased, affecting use by the user.

A backpack power supply apparatus is an apparatus for powering an electric tool. The backpack power supply apparatus is carried by the user on the back to reduce the weight that the user's hand needs to bear. The backpack power supply apparatus includes a battery cell that stores electric energy. The battery cell is electrically connected to a motor of the electric tool to power the motor.

A user is prone to fatigue when the user wears a conventional backpack power supply apparatus for a long time or changes a working posture.

SUMMARY

To solve deficiencies in the related art, an object of the present disclosure is to provide a backpack tool system and a backpack power supply apparatus thereof that are comfortable to wear.

A backpack power supply apparatus includes a battery pack for providing electric energy, a body for supporting the battery pack, and a wearable device. The battery pack is detachably connected to the body. The body is at least partially symmetrical about a plane, and the body defines a height in a heightwise direction. The wearable device is connected to the body and is wearable by a user to carry the body. The wearable device includes a strap having an upper end connected to an upper portion of the body. The upper end of the strap applies a force to the body when the user wears the wearable device. An included angle between a projection of a direction of the force on the plane and the heightwise direction is greater than or equal to 30 degrees and less than or equal to 50 degrees.

Further, the body further defines a depth in a front-rear direction, the battery pack is connected to a rear portion of the body, a front portion of the body is provided with a back plate extending along the heightwise direction, and, a projection of a center of gravity of an entirety formed of the battery pack and the body on the plane is between a projection of a straight line on which the force is located on the plane and a projection of the back plate on the plane.

Further, the battery pack is connected to a rear portion of the body, a front portion of the body is provided with a back plate extending along the heightwise direction, and a ratio of a distance from a center of gravity of an entirety formed of the battery pack and the body to the back plate to a length of the entirety formed of the battery pack and the body in the front-rear direction is greater than 0 and less than or equal to 0.85.

Further, the wearable device includes a back pad for contacting a back of the user, and the back pad is slidably connected to the body along the heightwise direction.

Further, the back pad is secured to the strap.

Further, the backpack power supply apparatus further includes a slider slidably connected to the body, wherein the back pad is secured to the slider, the body is provided with a guide slot, and the slider is provided with a protrusion sliding along the guide slot.

Further, the battery pack is slidably connected to the body, a projection of the body on the plane is L-shaped, and a projection of the battery pack on the plane is located in an included angle region of the L-shaped projection of the body.

Further, the body includes a base for supporting the body and a guide portion for guiding the battery pack to slide relative to the body and along the heightwise direction, and the base and the guide portion form an L shape.

Further, two side stoppers protrude from the guide portion toward the battery pack, and the two side stoppers are located on two sides of the battery pack respectively.

Further, the backpack power supply apparatus includes a cable for outputting the electric energy. The body is provided with an input terminal electrically connected to the battery pack and further includes a wire electrically connected to the input terminal and the cable. The body includes a first housing and a second housing, and the first housing and the second housing form a receiving chamber and the wire is disposed in the receiving cavity.

Further, the wearable device includes a shoulder pad for contacting the back of the user, the shoulder pad and the back pad form an entirety, and the shoulder pad is secured to the strap.

Further, a direction in which the battery pack is mounted is parallel to a direction in which the back pad slides relative to the body.

Further, the body defines a front-rear direction, the battery pack is connected to a rear portion of the body, a front portion of the body is provided with a back plate extending along the heightwise direction, and a projection of a center of gravity of the battery pack on the plane is between the projection of the straight line on which the force is located on the plane and a projection of the back plate on the plane.

Further, the slider is detachably connected to the body.

A backpack power supply apparatus includes a backpack power supply apparatus and an electric tool. The backpack power supply apparatus includes a battery pack for providing electric energy, a body for carrying the battery pack, and a wearable device. The battery pack is detachably connected to the body. The body is at least partially symmetrical about a plane, and the body defines a height in a heightwise direction. The wearable device is connected to the body and is wearable by a user to carry the body. The wearable device includes a strap having an upper end connected to an upper portion of the body. The upper end of the strap applies a force to the body when the user wears the wearable device. An included angle between a projection of a direction of the force on the plane and the heightwise direction is greater than or equal to 30 degrees and less than or equal to 50 degrees. The electric tool includes a motor and a housing for receiving the motor. The battery pack is detachably connected to the housing and powers the motor.

Further, the wearable device includes a back pad for contacting a back of the user, the back pad is slidably connected to the body along the heightwise direction, and the back pad is secured to the strap.

It is to be understood that the foregoing describes various examples of the subject backpack tool system and a backpack power supply apparatus thereof and that the various components and arrangements of components set forth above may be adopted in whole or in a part as needed for any particular purpose.

The present disclosure is beneficial in that the battery pack of the backpack power supply apparatus is detachably connected to the body so that a new battery pack can be used in place of the original one when a power of the battery pack is low, thereby prolonging a service time. The configuration of the direction of the force the strap of the wearable device applies to the body allows the user to feel comfortable and effortless when the user wears the apparatus. The configuration of the direction of the applied force and the configuration of the center of gravity of the integral whole formed of the battery pack and the body makes it difficult for the body to fall backward, and the configuration of making the wearable device slideable relative to the body and the configuration of securing to the strap allow the backpack power supply apparatus to be still in a state that makes the user feel comfortable and effortless when the user changes an operating posture, for example, bends over.

DETAILED DESCRIPTION

Figure 1:
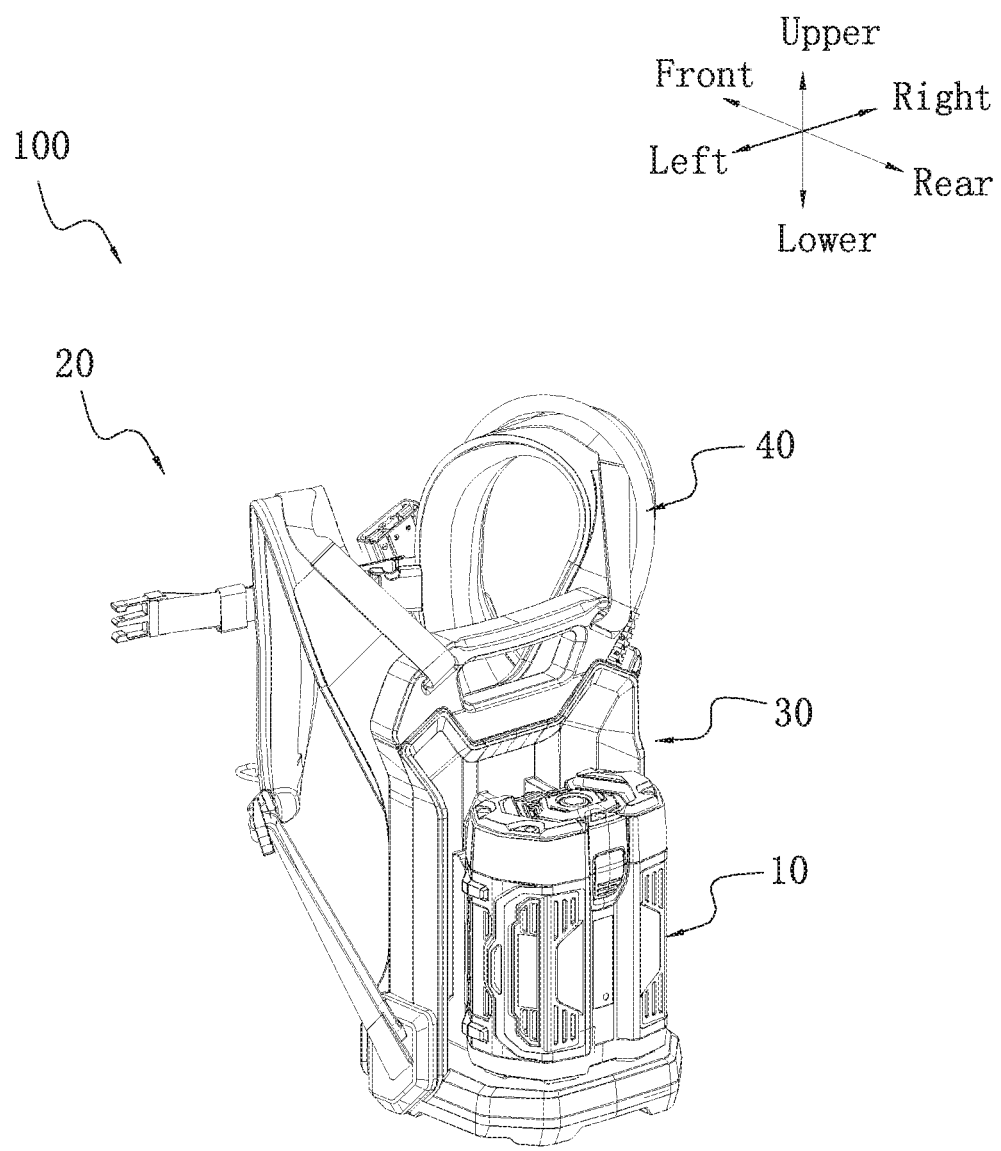
FIG. 1 is a perspective view of an exemplary backpack power supply apparatus.
Figure 2:
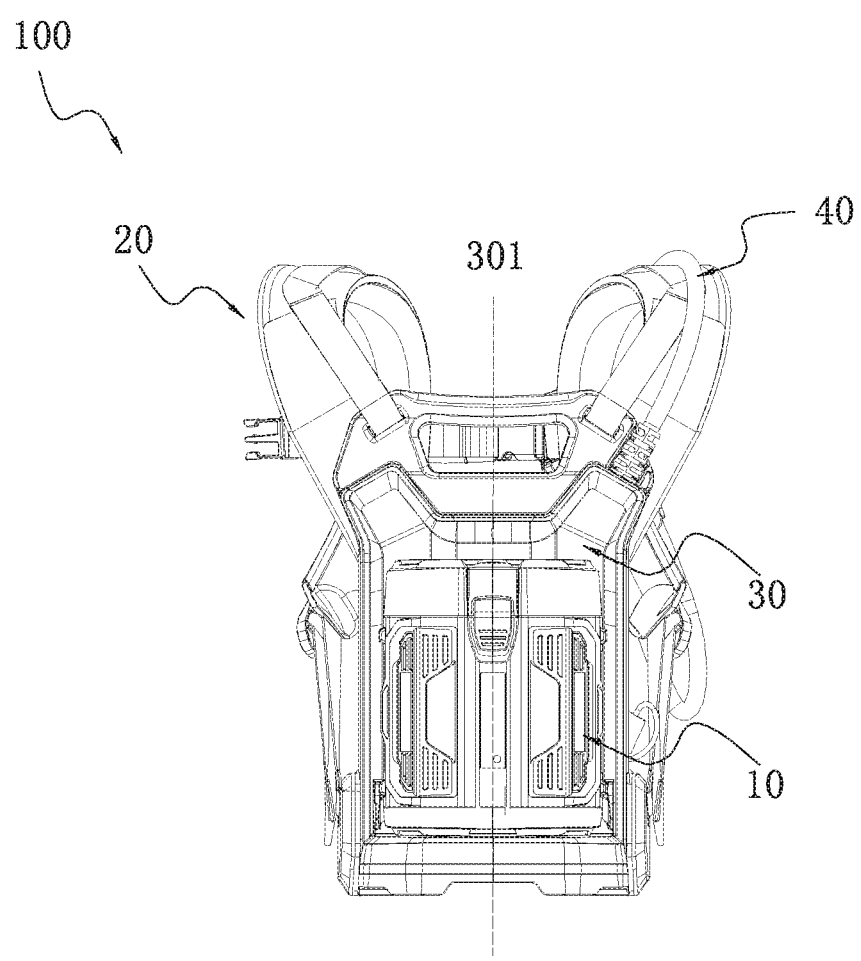
FIG. 2 is a plan view of the backpack power supply apparatus of FIG. 1.

The present disclosure will be described below in detail in conjunction with the accompanying drawings and various examples.

As shown in FIGS. 1 to 4, a backpack power supply apparatus 100 includes a battery pack 10, a wearable device 20 and a body 30.

The battery pack 10 is used for outputting electric energy. The body 30 carries the battery pack 10. The battery pack 10 is detachably connected to the body 30. In an alternative example, the battery pack 10 may also be secured to the body 30 as a non-detachable portion.

The wearable device 20 is connected to the body 30. The wearable device 20 is wearable by a user to carry the body 30. The wearable device 20 includes a strap 21. Two ends of the strap 21 are connected to the body 30. The two ends of the strap 21 apply a force to the body 30 when the user wears the strap 21. Specifically, the strap 21 includes an upper end connected to an upper portion of the body 30 and a lower end connected to a lower portion of the body 30. The upper end of the strap 21 applies a force F1 to the body 30 when the user wears the wearable device 20.

Upper-lower, front-rear and left-right directions are defined for the body 30 when the user wears the wearable device 20, that is, when the backpack power supply apparatus 100 is in a working state. The upper-lower direction is a heightwise direction and defines a device height. A back of the user is on the front of the body 30. The battery pack 10 is connected to a rear portion of the body 30. The upper portion of the body 30 is provided with a handle 321. The handle 321 is provided for the user to carry the backpack power supply apparatus 100.

Figure 3:
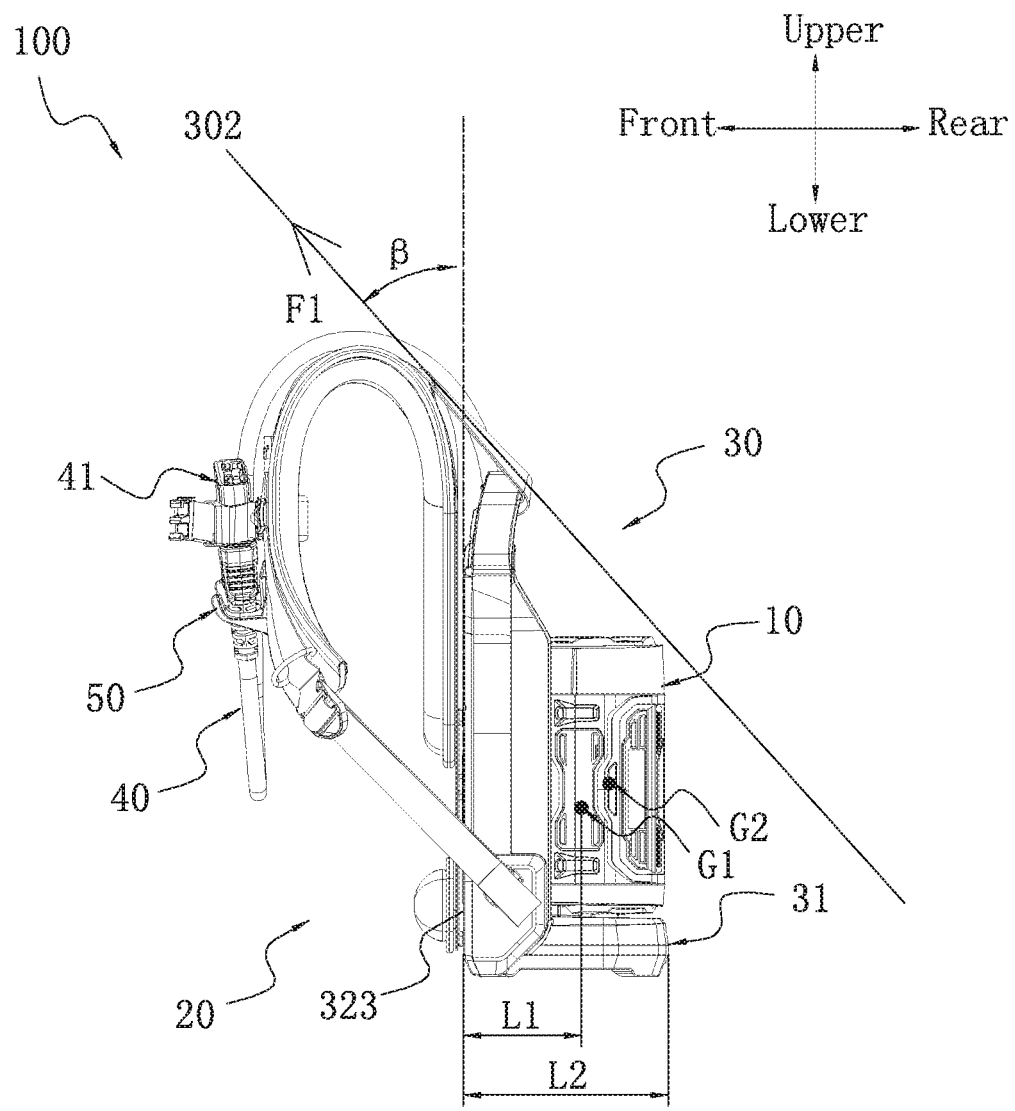
FIG. 3 is a plan view of the backpack power supply apparatus of FIG. 1 taken from another perspective.
Figure 7:
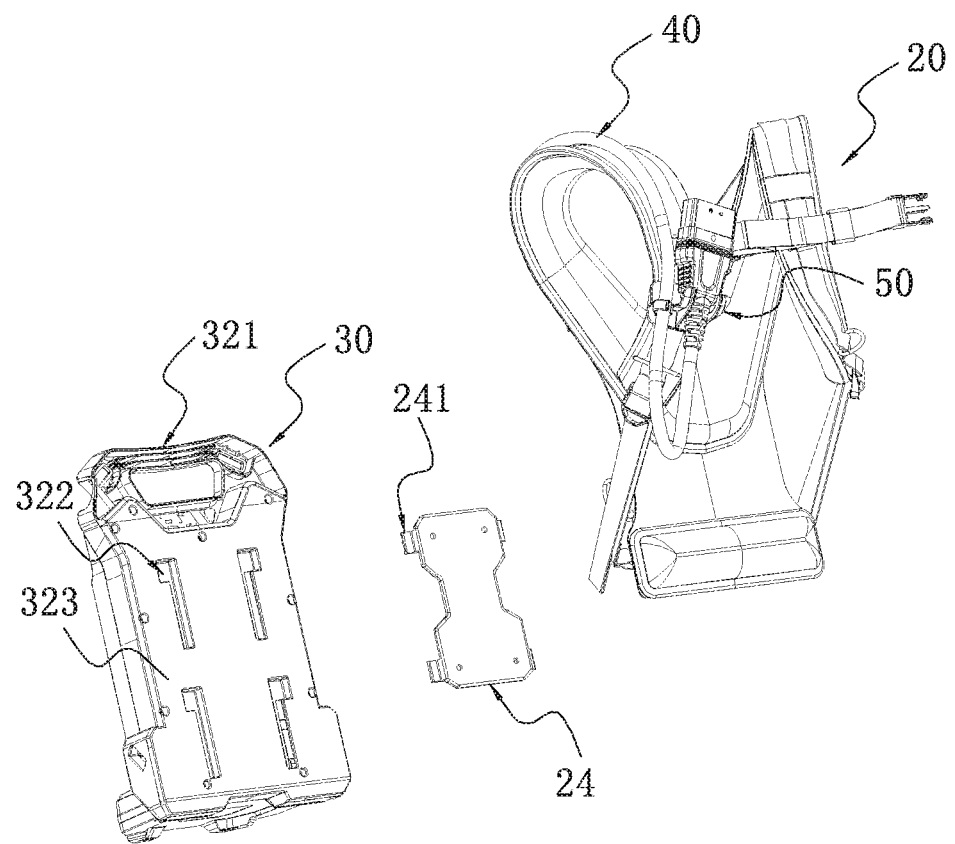
FIG. 7 is an exploded view of the structure of FIG. 5 taken from another perspective.
Figure 8:
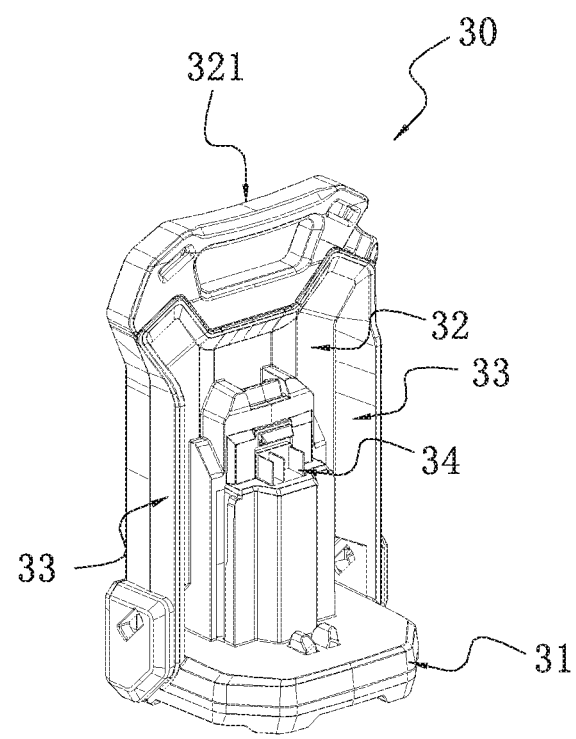
FIG. 8 is a perspective view of a housing of the body of the backpack power supply apparatus of FIG. 1.
Figure 9:
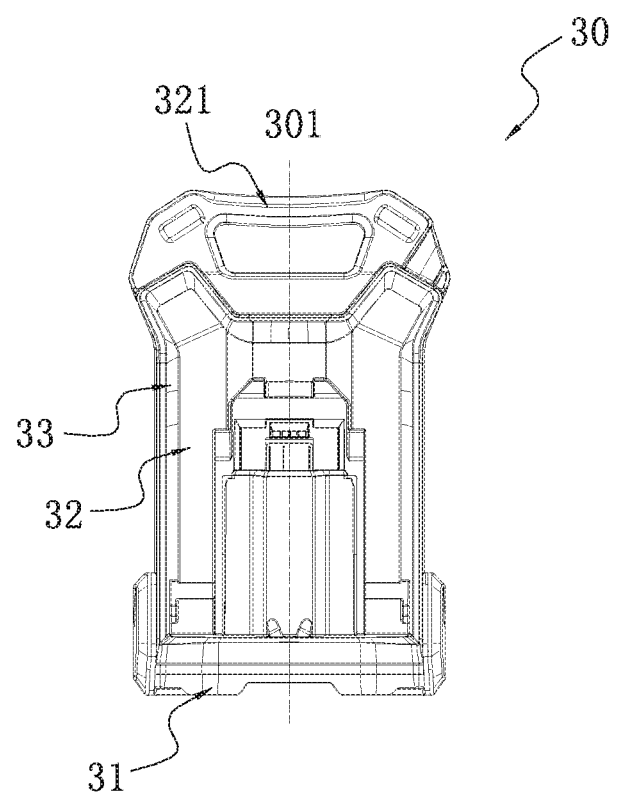
FIG. 9 is a plan view of the structure of FIG. 8.
Figure 10:
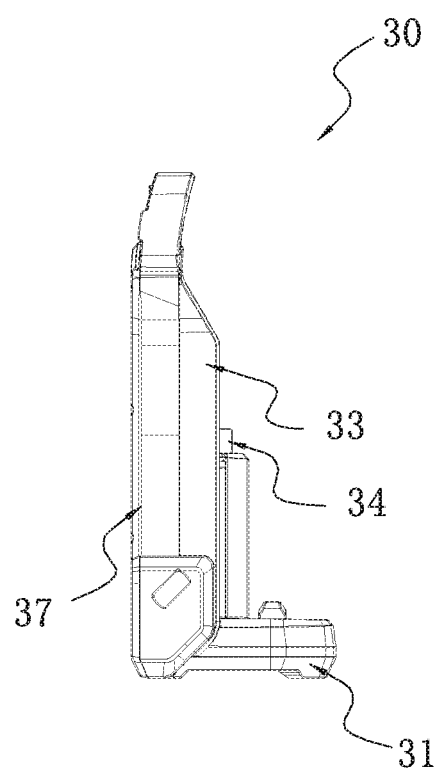
FIG. 10 is a plan view of the structure of FIG. 8 taken from another perspective.

As shown in FIGS. 3 and 7, a front portion of the body 30 is provided with a back plate 323. The back plate 323 extends along the heightwise direction. The back plate 323 is flat surface.

A plane 301 is defined for the body 30. The body 30 is at least partially symmetrical about the plane 301. Specifically, the body 30 is at least partially symmetrical in the left-right direction.

An included angle β between a projection of a direction of the force F1, which is applied by the upper end of the strap 21 to the body 30, on the plane 301 and the heightwise direction is greater than or equal to 30 degrees and less than or equal to 50 degrees.

The specific direction of the force F1 applied by the upper end of the strap 21 to the body 30 makes the user feel effortless and prevents the body 30 from falling backward when the user wears the wearable device 20. The body 30 keeps upright and is comfortable to wear.

A projection of a center of gravity G1 of an entirety formed of the battery pack 10 and the body 30 on the plane 301 is between a projection of a straight line 302 on which the force F1 is located and a projection of the back plate 323. The straight line 302 on which the force F1 is located is a straight line passing a point where the force F1 is applied and parallel to the direction of the force F1.

The center of gravity G1 of the entirety formed of the battery pack 10 and the body 30 also prevents the body 30 from falling backward when the user wears the wearable device 20, which would otherwise cause the body 30 to apply a forward force to the back of the user and cause discomfort.

When the user extends a length of the strap 21, the included angle β between the projection of the direction of the force F1, which is applied by the upper end of the strap 21 to the body 30, on the plane 301 and the heightwise direction becomes smaller, the center of gravity G1 of the entirety formed of the battery pack 10 and the body 30 approaches the straight line 302 on which the force F1, which is applied by the upper end of the strap 21 to the body 30, is located, and the user feels more effortless to wear the wearable device 20.

A projection of a center of gravity G2 of the battery pack 10 on the plane 301 is between the projection of the straight line 302 on which the force F1 is located and the projection of the back plate 323. A ratio of a distance L1 from the center of gravity G1 of the entirety formed of the battery pack 10 and the body 30 to the back plate 323 to a length L2 of the entirety formed of the battery pack 10 and the body 30 in the front-rear direction is greater than 0 and less than or equal to 0.85. Further, the ratio of the distance L1 from the center of gravity G1 of the entirety formed of the battery pack 10 and the body 30 to the back plate 323 to the length L2 of the entirety formed of the battery pack 10 and the body 30 in the front-rear direction is greater than 0 and less than or equal to 0.75.

Figure 5:
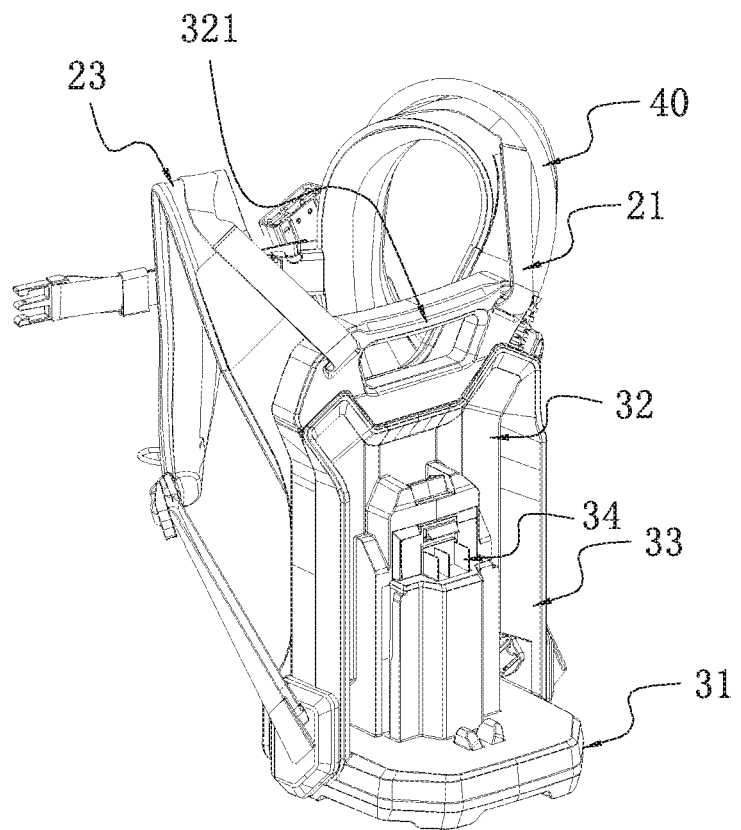
FIG. 5 is a schematic diagram in which a battery pack of the backpack power supply apparatus of FIG. 1 has been removed.
Figure 6:
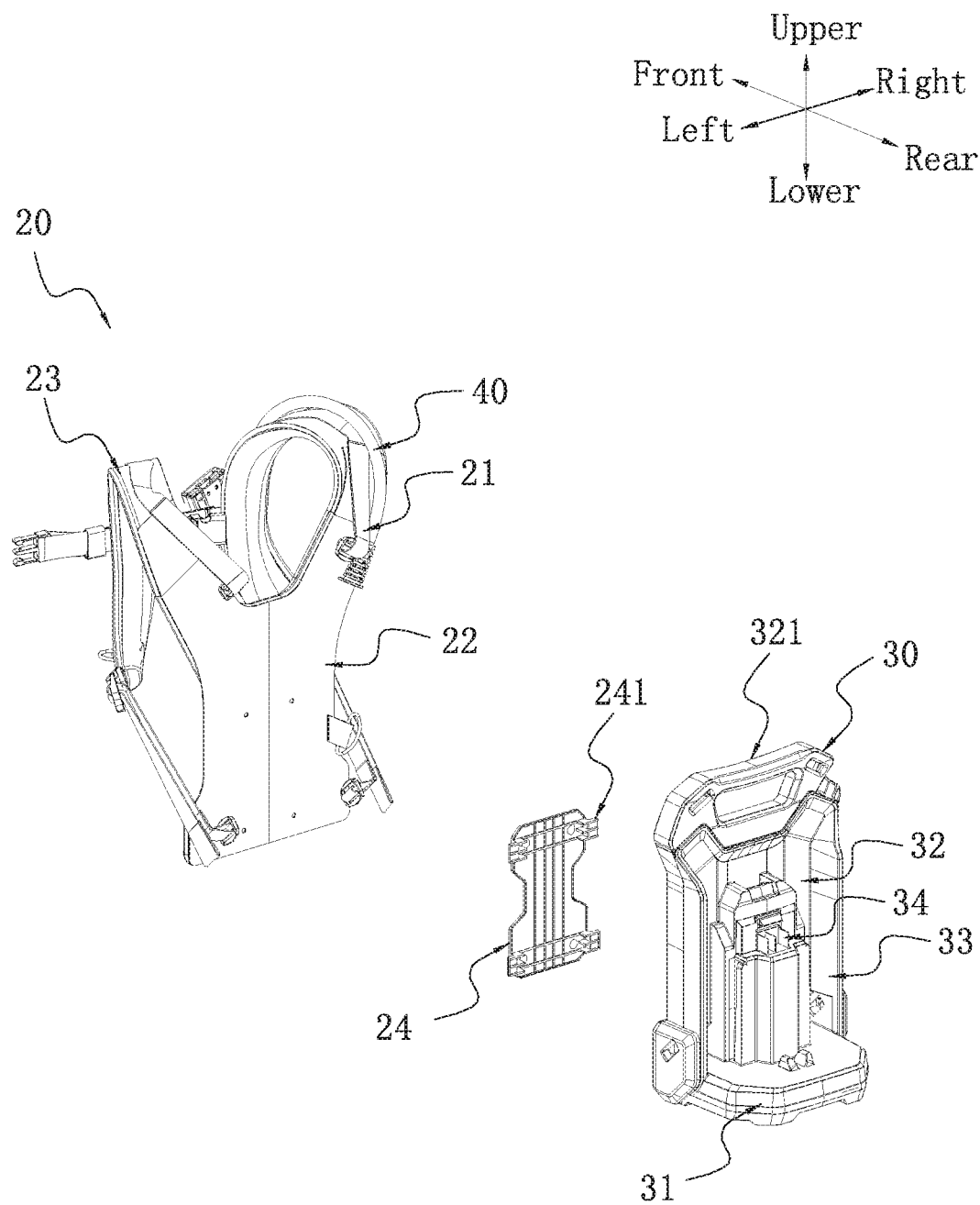
FIG. 6 is an exploded view of the structure of FIG. 5.

As shown in FIGS. 5 to 7, the wearable device 20 includes a back pad 22 for contacting the back of the user. The back pad 22 is connected to the body 30 and slidable along the heightwise direction.

When the user bends over, the back pad 22 can abut against the back of the user and move relative to the body 30 and thus make the user feel comfortable.

The back pad 22 is secured to the strap 21. When the length of the strap 21 varies, the direction of the force F1 applied by the strap 21 to the body 30 varies, and the back pad 22 varies in the heightwise direction as the included angle β of the strap 21 varies, and thus the apparatus is comfortable to wear.

In an example, the wearable device 20 further includes a shoulder pad 23. The shoulder pad 23 is secured to the back pad 22. The shoulder pad 23 coincides at least in part with the strap 21. The shoulder pad 23 is secured to the strap 21. The shoulder pad 23 and the back pad 22 can form an entirety.

In an alternative example, the shoulder pad 23 and the strap 21 are integrally formed.

In another alternative example, the shoulder pad 23 is secured to the strap 21 as a separate part. That is, the shoulder pad 23 and the back pad 22 are not an entirety.

The wearable device 20 further includes a slider 24. The slider 24 is slidably connected to the body 30. The back pad 22 is secured to the slider 24. The slider 24 is made of a plastic material.

The slider 24 is provided with a protrusion 241. The body 30 is provided with a guide slot 322. The protrusion 241 slides in the heightwise direction inside the guide slot 322.

The battery pack 10 is slidably connected to the body 30. A direction in which the battery pack 10 is mounted is parallel to a direction in which the back pad 22 slides relative to the body 30. When the user wears the wearable device 20, the user mounts the battery pack 10 in the downward direction, and the back pad 22 slides upward because friction between the battery pack 10 and the body 30 and gravity of the battery pack 10 cause the body 30 to move downward. The back pad 22 moves relative to the body 30, not causing the back pad 22 to apply a downward force F1 to the back of the user and thus making the apparatus comfortable to use. As the body 30 moves downward, the included angle β between the projection of the direction of the force F1 on the plane 301 and the heightwise direction becomes smaller, and thus the user feels more effortless when wearing the apparatus.

The slider 24 is detachably connected to the body 30.

As shown in FIGS. 2, 3, and 8 to 10, a projection of the body 30 on the plane 301 is L-shaped, and the battery pack 10 is located in an included angle region of the L-shaped projection.

Specifically, the body 30 includes a base 31 and a guide portion 32. The base 31 is used for supporting the body 30 so that the body 30 can be placed on the ground. The guide portion 32 is used for guiding the battery pack 10 to slide relative to the body 30 and along the heightwise direction. The base 31 and the guide portion 32 form the L shape.

Two side stoppers 33 protrude from the guide portion 32 toward the battery pack 10. The side stoppers 33 are strip-shaped and extend along the heightwise direction. The two side stoppers 33 are located on two sides of the battery pack 10 respectively.

Figure 4:
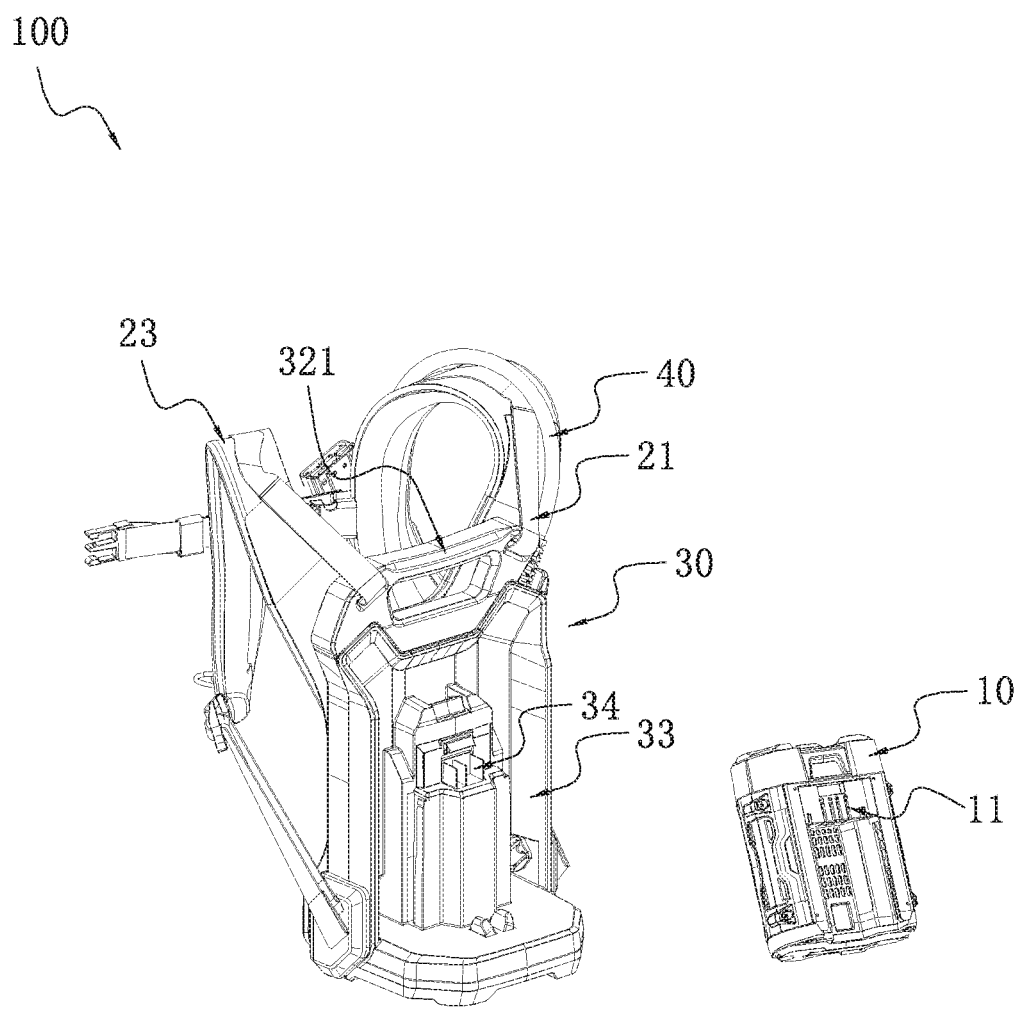
FIG. 4 is a schematic diagram in which a battery pack and a body of the backpack power supply apparatus of FIG. 1 are separated from each other.

As shown in FIG. 4, the battery pack 10 is provided with a second electric energy output interface 11 and multiple battery cells. The battery cell is used for storing electric energy. The second electric energy output interface 11 is used for outputting electric energy.

As shown in FIGS. 4 and 7, the body 30 is provided with a first electric energy input interface 34 and a first electric energy output interface 41. The first electric energy input interface 34 is configured to match the second electric energy output interface 11. When the battery pack 10 is joined to the body 30, the first electric energy input interface 34 is electrically connected to the second electric energy output interface 11. The first electric energy output interface 41 is electrically connectable to the first electric energy input interface 34.

The body 30 includes a body housing 37. The battery pack 10 is detachably connected to the body housing 37.

In an example, the body 30 further includes a cable 40. One end of the cable 40 is connected to the body housing 37. The other end of the cable 40 is provided with the first electric energy output interface 41.

In an alternative example, the first electric energy output interface is disposed on the body housing and the body does not include the cable.

Figure 16:
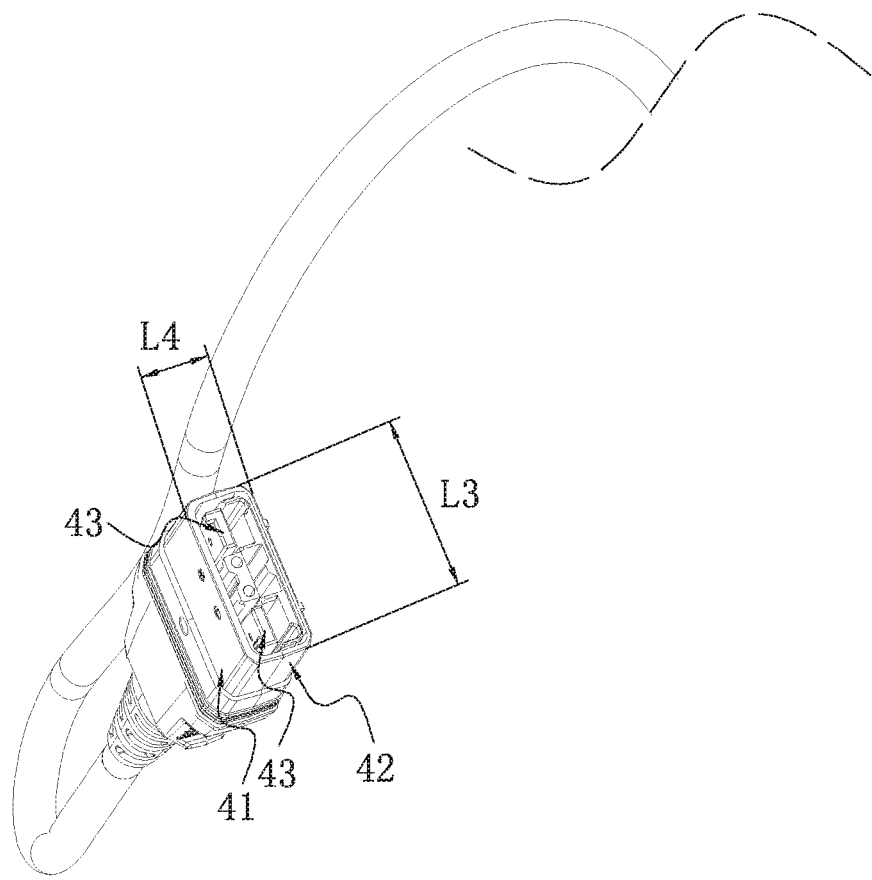
FIG. 16 is a schematic diagram of the cable of the backpack power supply apparatus of FIG. 1.
Figure 17:
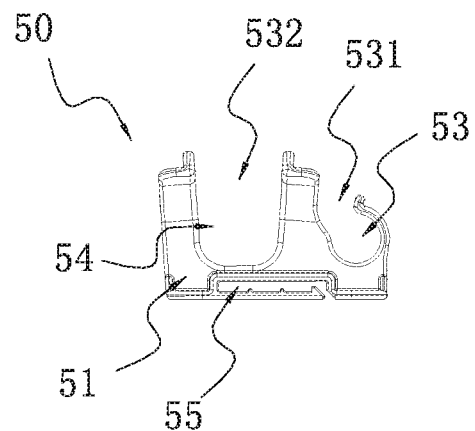
FIG. 17 is a schematic diagram of the securing member of the backpack power supply apparatus of FIG. 1.
Figure 18:
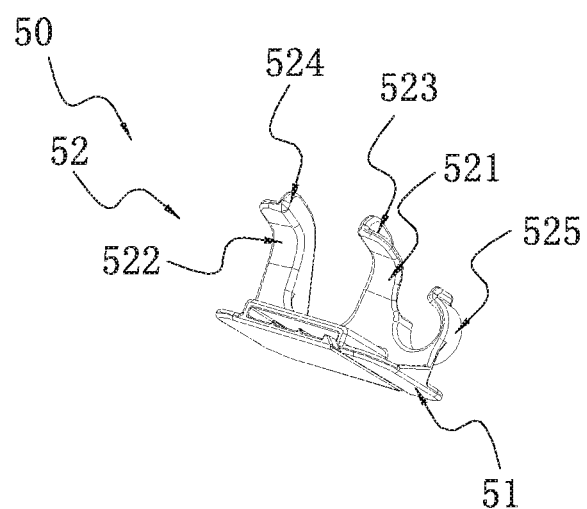
FIG. 18 is a schematic diagram of the securing member of the backpack power supply apparatus of FIG. 1 taken from another perspective.

As shown in FIG. 16, the first electric energy output interface 41 includes a terminal housing 42 and at least two electrode members 43. A lengthwise direction and a widthwise direction are defined for the terminal housing 42. The lengthwise direction and the widthwise direction are vertical to a direction in which the first electric energy output interface 41 is mounted. A length L3 of the terminal housing 42 in the lengthwise direction is greater than a length L4 of the terminal housing 42 in the heightwise direction. The electrode members 43 are disposed in the terminal housing 42, and are arranged along the lengthwise direction.

A ratio of the length L3 of the terminal housing 42 in the lengthwise direction to the length L4 of the terminal housing 42 in the heightwise direction is greater than or equal to 1.5 and less than or equal to 4. The ratio of the length L3 of the terminal housing 42 in the lengthwise direction to the length L4 of the terminal housing 42 in the heightwise direction is greater than or equal to 2 and less than or equal to 3. A length of the terminal housing 42 in the widthwise direction is greater than or equal to 15 mm and less than or equal to 30 mm. The length L3 of the terminal housing 42 in the lengthwise direction is greater than or equal to 40 mm and less than or equal to 60 mm.

Figure 11:
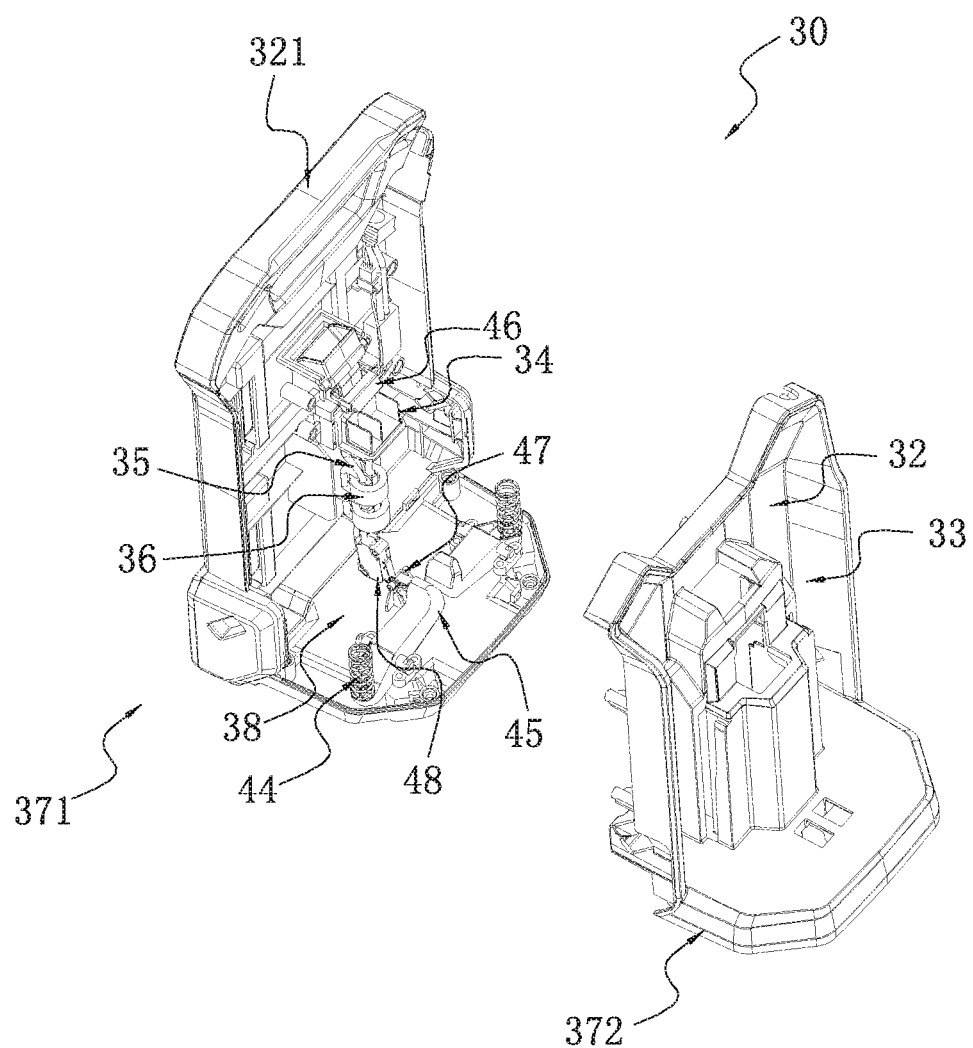
FIG. 11 is an exploded view of the structure of FIG. 8.
Figure 12:
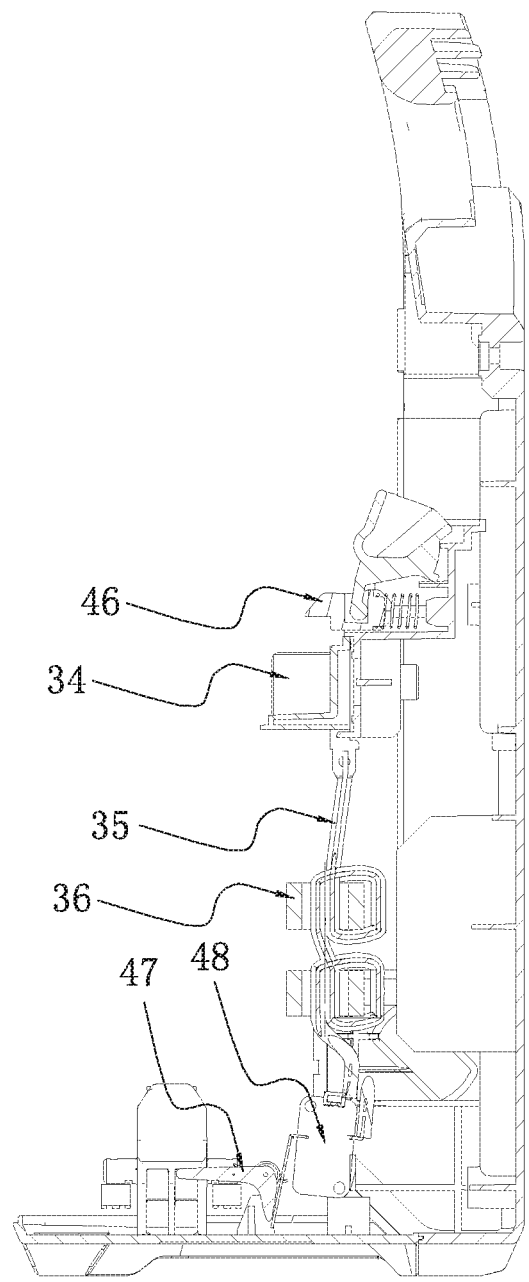
FIG. 12 is a schematic diagram in which a safety switch of the backpack power supply apparatus of FIG. 1 is in a second state.
Figure 13:
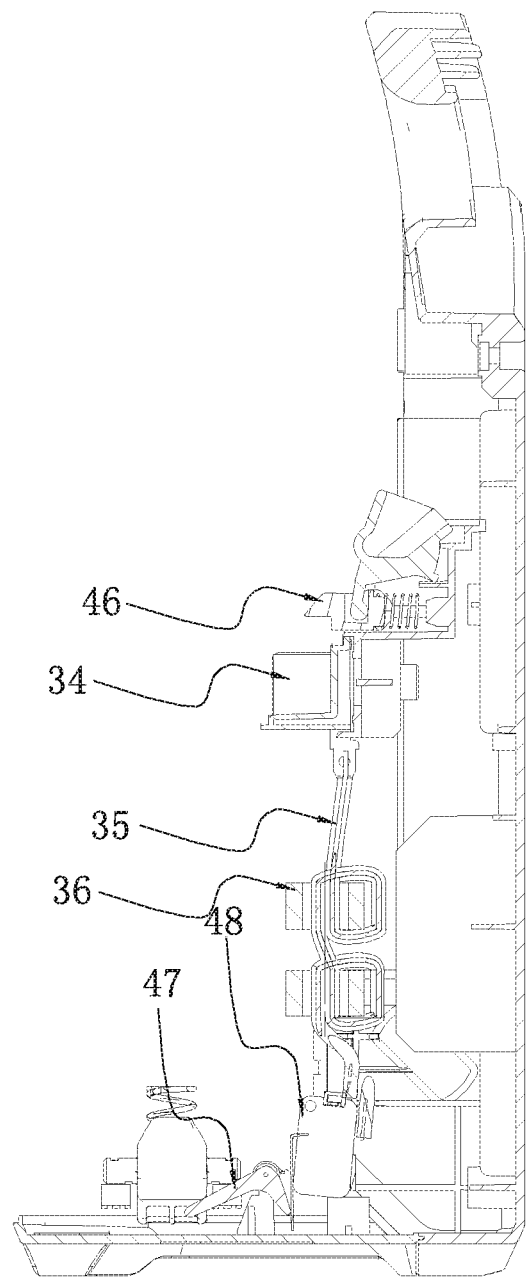
FIG. 13 is a schematic diagram in which the safety switch of the backpack power supply apparatus of FIG. 1 is in a first state.
Figure 14:
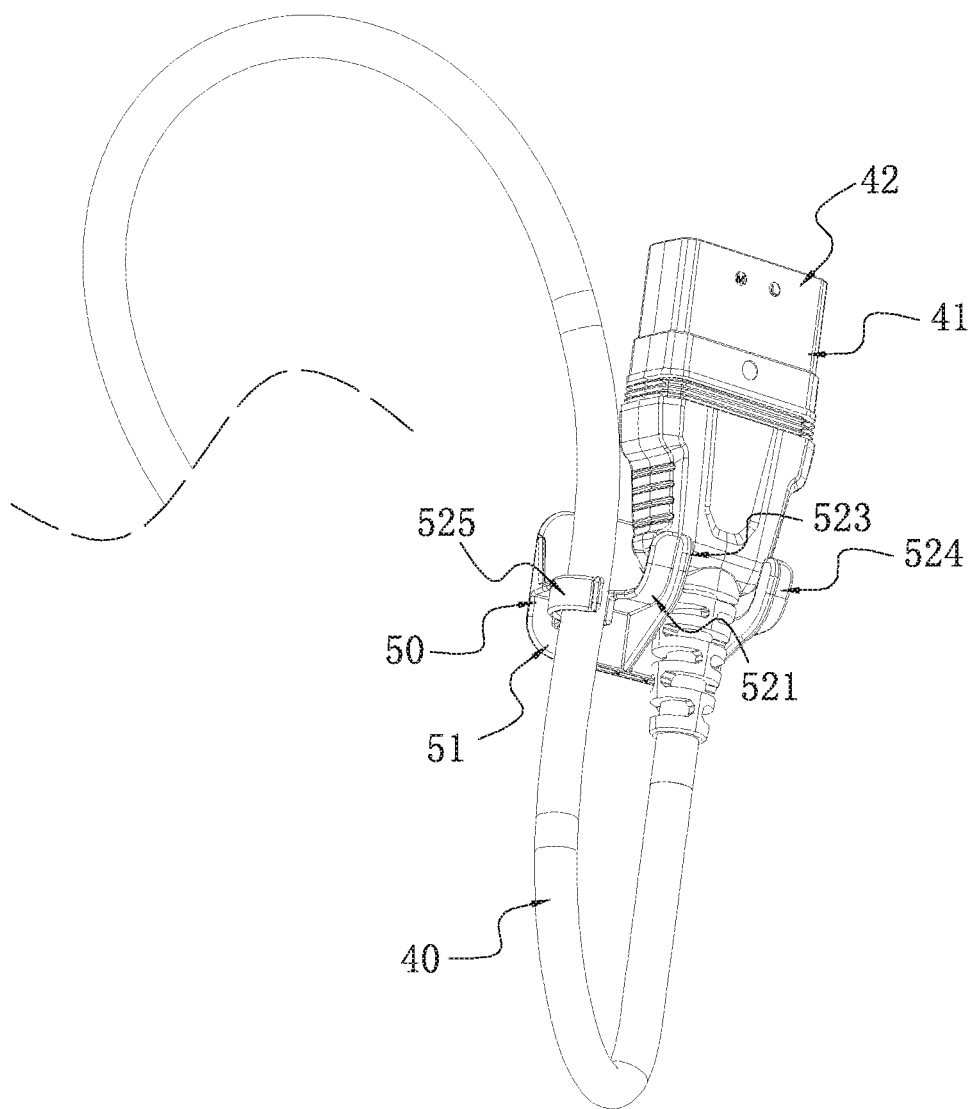
FIG. 14 is a schematic diagram of a cable and a securing member of the backpack power supply apparatus of FIG. 1.
Figure 15:
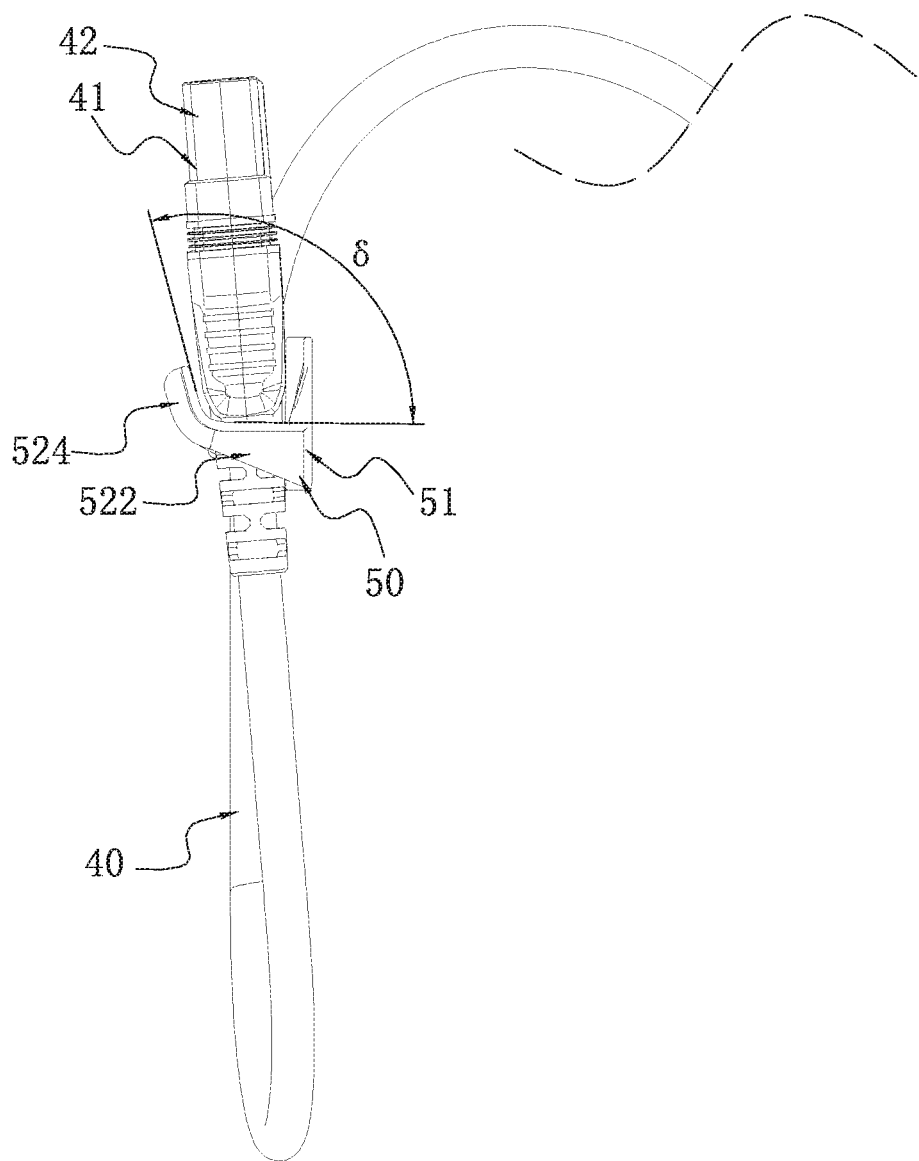
FIG. 15 is a schematic diagram of the structure of FIG. 14 taken from another perspective.

As shown in FIGS. 11 to 13, the body 30 further includes a safety switch 48. The body housing 37 includes a first housing 371 and a second housing 372. The first housing 371 and the second housing 372 form a receiving chamber 38. The safety switch 48 is disposed in the receiving chamber 38.

The safety switch 48 is electrically connected between the first electric energy output interface 41 and the first electric energy input interface 34. The safety switch 48 has a first state in which the first electric energy output interface 41 is connected to the first electric energy input interface 34 and a second state in which the first electric energy output interface 41 is disconnected from the first electric energy input interface 34. The safety switch 48 is in the second state in FIG. 12. The safety switch 48 is in the first state in FIG. 13.

When the battery pack 10 is joined to the body 30, the safety switch 48 is in the first state, and the first electric energy output interface 41 is electrically connected to the first electric energy input interface 34. When the battery pack 10 is separated from the body 30, the safety switch 48 is in the second state, and the first electric energy output interface 41 is electrically disconnected from the first electric energy input interface 34.

After the battery pack 10 is separated from the body 30, the electrical connection between the first electric energy output interface 41 and the first electric energy input interface 34 is cut off through the safety switch 48. When the first electric energy output interface 41 is connected to a tool, electricity of a capacitor and other electric storage devices of the tool is transmitted to the first electric energy output interface 41 but cannot be transmitted to the first electric energy input interface 34. This helps to prevent an electric shock when the user touches the exposed first electric energy input interface 34.

The body 30 further includes a wire 35 and a magnetic ring 36. The wire 35 is disposed in the receiving chamber 38. The magnetic ring 36 is also disposed in the receiving chamber 38. The wire 35 passes through the magnetic ring 36, and electrically connects the cable 40 and the first electric energy input interface 34 so that the first electric energy input interface 34 is electrically connected to the first electric energy output interface 41. The safety switch 48 is connected to the wire 35.

The body 30 further includes a contacting member 45 and a biasing member 44. The contacting member 45 is movably connected to the body housing 37. The contacting member 45 is rotatably connected to the body housing 37. The contacting member 45 is used for contacting the battery pack 10. The contacting member 45 has a first position and a second position. When the battery pack 10 is joined to the body 30, the battery pack 10 presses the contacting member 45 against a force of the biasing member 44 to place the contacting member 45 in the first position. When the battery pack 10 is separated from the body 30, the biasing member 44 applies a force to the contacting member 45 to move the contacting member 45 to the second position.

The biasing member 44 applies a force to the contacting member 45 causing the contacting member 45 to move from the first position to the second position, such that the battery pack 10 is separated from the body 30. The biasing member 44 and the contacting member 45 assist in separating the battery pack 10 from the body 30.

In an example, the biasing member 44 is a spring. The spring is disposed between the body housing 37 and the contacting member 45. In another example, the biasing member 44 may be a resilient piece, a magnetic piece or an electromagnet.

The body 30 further includes a locking member 46. When the battery pack 10 is joined to the body 30, the locking member 46 is joined to the battery pack 10 to lock the battery pack 10. When the locking member 46 is separated from the battery pack 10 by the user, the battery pack 10 is separated from the body 30 by the biasing member 44.

In FIG. 13, when the contacting member 45 is in the first position, the contacting member 45 triggers the safety switch 48 such that the safety switch 48 is in the first state. In FIG. 12, when the contacting member 45 is in the second position, the safety switch 48 is in the second state.

The body 30 further includes a transmission member 47. One end of the transmission member 47 is in contact with the contacting member 45 and the other end of the transmission member 47 is in contact with an action reed or an action contact of the safety switch 48. The transmission member 47 is movably connected to the body housing 37. The transmission member 47 is rotatably connected to the body housing 37. The transmission member 47 is disposed in the receiving chamber 38. When the user mounts the battery pack 10 to join the battery pack 10 to the body housing 37, the contacting member 45 is driven by the battery pack 10 to move from the second position to the first position. The contacting member 45 drives the transmission member 47 to rotate and the transmission member 47 triggers the safety switch 48 such that the first electric energy output interface 41 is connected to the first electric energy input interface 34.

When the battery pack 10 is separated from the body housing 37, the contacting member 45 and the transmission member 47 are reset and the safety switch 48 cuts off the electrical connection between the first electric energy output interface 41 and the first electric energy input interface 34.

As shown in FIGS. 7, and 14 to 18, the backpack power supply apparatus 100 further includes a securing member 50. The securing member 50 is used for securing the first electric energy output interface 41. Further, the securing member 50 can also secure the cable 40. The securing member 50 is secured to the wearable device 20 or the battery pack 10 by the user when the user wears the wearable device 20. Specifically, the securing member 50 is secured to the strap 21.

In an alternative example, the securing member 50 can also be worn by the user when the user wears the wearable device 20. For example, the securing member 50 may be secured to a belt of the user, a garment of the user or other items worn by the user.

The securing member 50 is provided with a first securing slot 53 and a second securing slot 54. The cable 40 is secured to the first securing slot 53. The first electric energy output interface 41 is secured to the second securing slot 54.

The securing member 50 can secure the cable 40 and the first electric energy output interface 41 simultaneously, and the user can easily get the first electric energy output interface 41 and connect the first electric energy output interface 41 to the tool. The first securing slot 53 can adjust the length of a free section of the cable 40 by securing different positions of the cable 40.

The securing member 50 includes a securing member body 51 and a clamping portion 52. The securing member body 51 is secured to the strap 21. The clamping portion 52 is provided with the first securing slot 53 and the second securing slot 54. An opening 531 of the first securing slot 53 is smaller than a diameter of the cable 40. An opening 532 of the second securing slot 54 is larger than the opening 531 of the first securing slot 53. The securing member body 51 and the clamping portion 52 are integrally formed. The securing member 50 is made of a plastic material. The securing member body 51 is provided with a mounting slot 55 for securing the securing member 50. The strap 21 passes through the mounting slot 55. The first securing slot 53 and the second securing slot 54 are located on a same side of the securing member body 51. The securing member 50 is located on a front of a body of the user and the battery pack 10 is located on a rear of the body of the user when the user wears the wearable device 20.

The clamping portion 52 is provided with a first support arm 521 and a second support arm 522. The second securing slot 54 is disposed between the first support arm 521 and the second support arm 522. One end of the first support arm 521 is connected to the securing member body 51. Another end of the first support arm 521 is provided with a first bending portion 523. One end of the second support arm 522 is connected to the securing member body 51. Another end of the second support arm 522 is provided with a second bending portion 524.

The first electric energy output interface 41 is located between the securing member body 51 and the first bending portion 523. The first electric energy output interface 41 is located between the securing member body 51 and the second bending portion 524. The first bending portion 523 and the second bending portion 524 can prevent the first electric energy output interface 41 from disengaging from the second securing slot 54.

An included angle δ between the second bending portion 524 and the second support arm 522 is greater than 90 degrees and less than or equal to 180 degrees. Further, the included angle δ between the second bending portion 524 and the second support arm 522 is greater than 90 degrees and less than or equal to 135 degrees. It is convenient for the user to take out the first electric output interface 41 upward. An included angle between the first support arm 521 and the first bending portion 523 is greater than 90 degrees and less than or equal to 135 degrees. The included angle δ between the second bending portion 524 and the second support arm 522 is equal to the included angle between the first support arm 521 and the first bending portion 523.

An area of a projection of the first securing slot 53 is smaller than an area of a projection of the second securing slot 54. The opening 531 of the first securing slot 53 and the opening 532 of the second securing slot 54 are consistent in direction.

The first support arm 521 separates the second securing slot 54 from the first securing slot 53. The first support arm 521 is disposed between the second securing slot 54 and the first securing slot 53.

The clamping portion 52 is provided with a resilient arm 525. The resilient arm 525 and the first support arm 521 are separated to form the first securing slot 53, and the end portion of the resilient arm 525 and the end portion of the first support arm 521 are separated to form the opening 531. The opening 532 of the second securing slot 54 is larger than the diameter of the cable 40.

Figure 19:
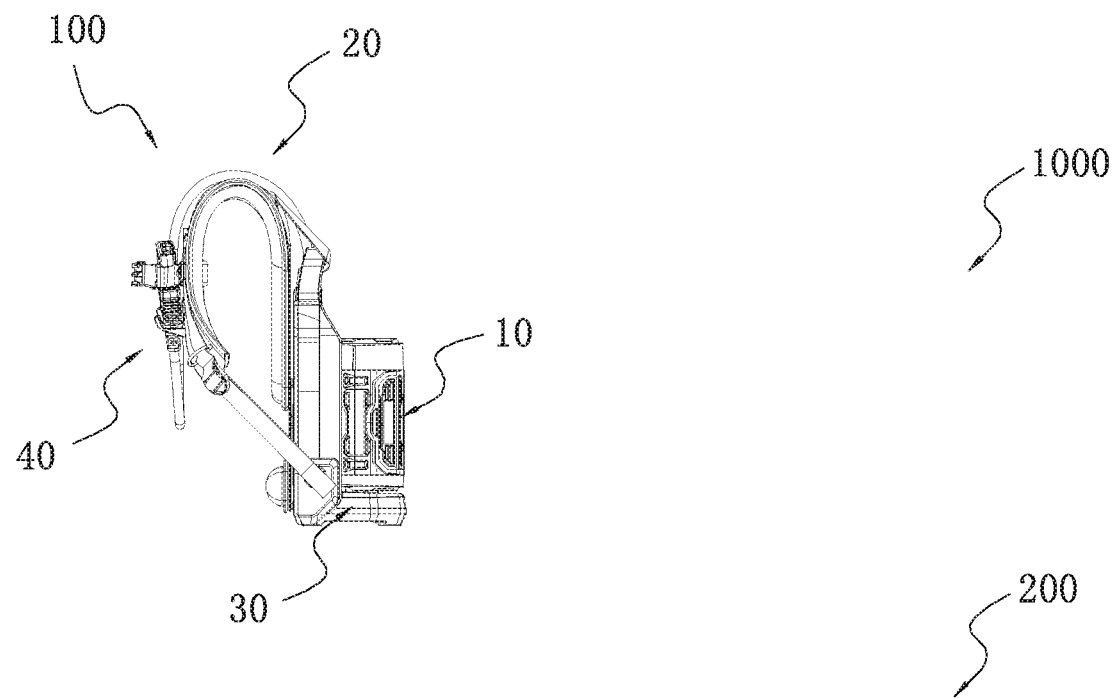
FIG. 19 is a schematic diagram of an exemplary backpack tool system including the backpack power supply apparatus of FIG. 1.
Figure 19:
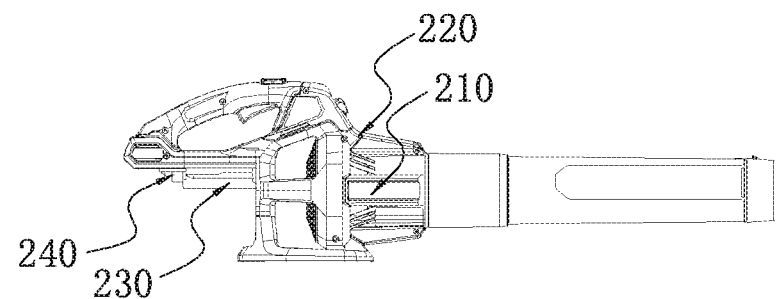

As shown in FIG. 19, a backpack tool system 1000 includes a backpack power supply apparatus 100 and an electric tool. In an example, the electric tool is a blower 200.

The blower 200 includes a motor 210 and a housing 220. The housing 220 accommodates the motor 210. In an example, the motor 210 is a direct current (DC) motor. The blower 200 includes a fan. The motor 210 drives the fan to rotate.

The housing 220 is provided with a joining portion 230. A battery pack 10 is detachably connected to the joining portion 230.

The joining portion 230 is provided with a tool electric input interface 240. The tool electric input interface 240 matches the second electric energy output interface 11.

When the battery pack 10 is joined to the joining portion 230, the tool electric input interface 240 is connected to the second electric energy output interface 11 and the battery pack 10 powers the motor 210. Alternatively, the battery pack 10 that is detachably connected to the housing 220 may be detachably connected to a body 30 to serve as the battery pack 10 for outputting electric energy of the backpack power supply apparatus 100.

A total weight of the battery pack 10 and the body 30 is greater than a weight of the electric tool. The total weight of the battery pack 10 and the body 30 is greater than or equal to 3 kg and less than or equal to 10 kg.

Figure 20:
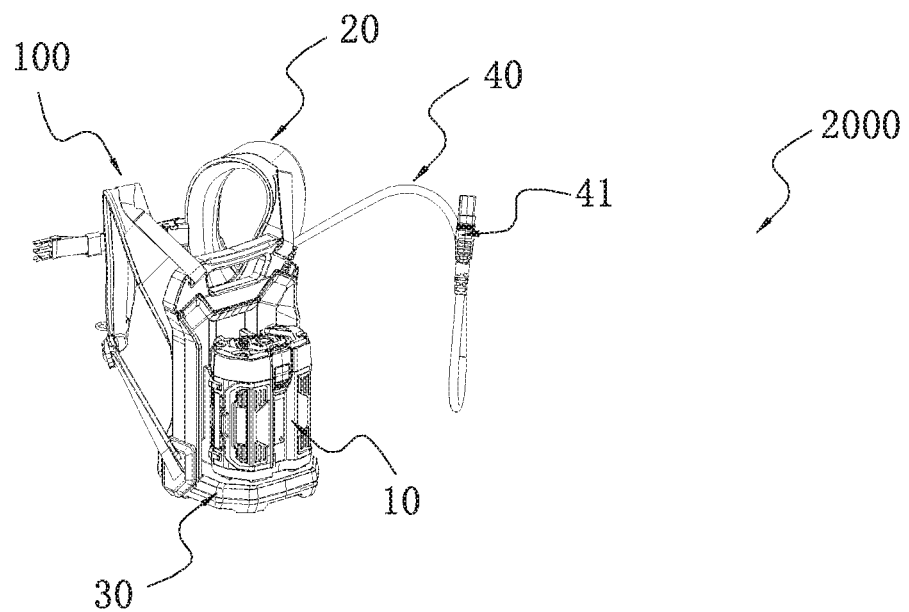
FIG. 20 is a schematic diagram of another exemplary backpack tool system including the backpack power supply apparatus of FIG. 1.
Figure 20:
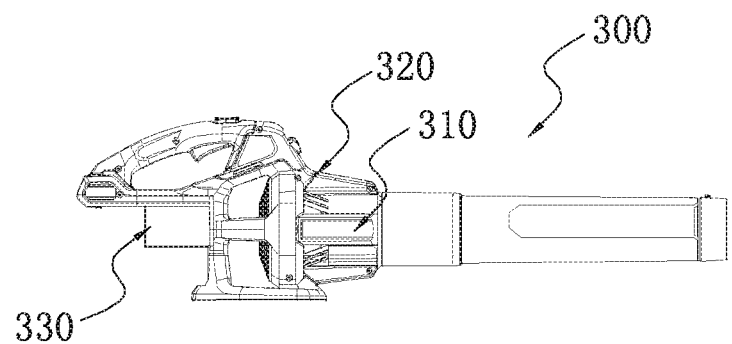

As shown in FIG. 20, the backpack tool system 2000 includes a backpack power supply apparatus 100 and an electric tool. In an example, the electric tool is a blower 300, and the backpack tool system 2000 includes the backpack power supply apparatus 100 and the blower 300.

The blower 300 includes a motor 310 and a housing 320. The housing 320 accommodates the motor 310. The motor 310 is a DC motor.

The blower 300 includes a fan. The motor 310 drives the fan to rotate. The blower 300 includes a tool electric input interface 330. The tool electric input interface 330 matches the first electric energy output interface 41. When the battery pack 10 is joined to the body 30, the battery pack 10 powers the motor 310.

A total weight of the battery pack 10 and the body 30 is greater than a weight of the electric tool. The total weight of the battery pack 10 and the body 30 is greater than or equal to 3 kg and less than or equal to 10 kg.

Figure 21:
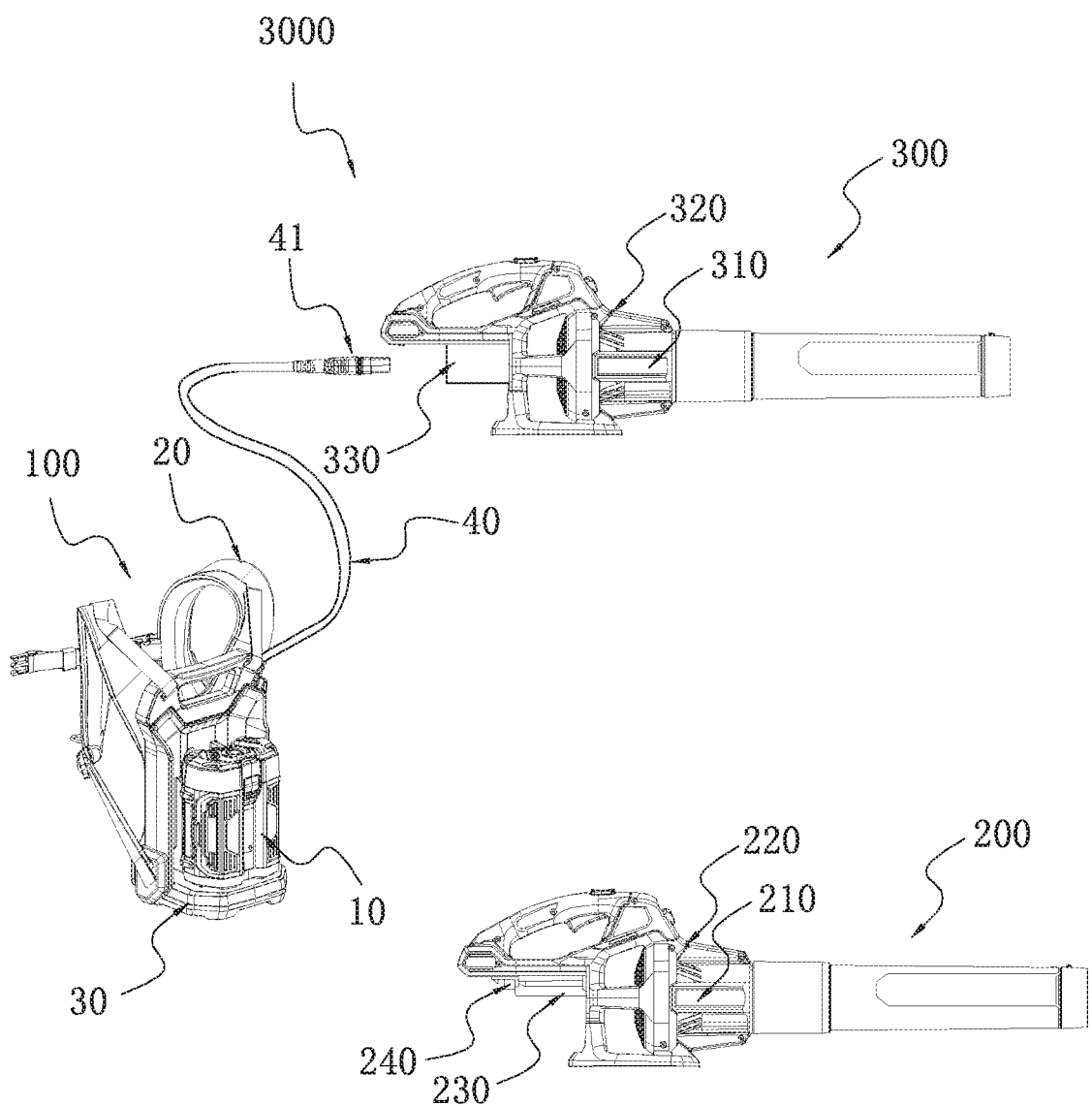
FIG. 21 is a schematic diagram of yet another exemplary backpack tool system including the backpack power supply apparatus of FIG. 1.

As shown in FIG. 21, a backpack tool system 3000 includes a backpack power supply apparatus 100, a first electric tool and a second electric tool.

The blower 300 serves as the first electric tool. A tool electric input interface 330 serves as a second electric energy input interface.

The blower 200 serves as the second electric tool. A tool electric input interface 240 serves as a third electric energy input interface.

A total weight of the battery pack 10 and the body 30 is greater than a weight of the first electric tool. The total weight of the battery pack 10 and the body 30 is greater than a weight of the second electric tool. The total weight of the battery pack 10 and the body 30 is greater than or equal to 3 kg and less than or equal to 10 kg.

The battery pack 10 can be adapted to both the second electric tool and the body 30. The battery pack 10 may be connected to the second electric tool to power the second electric tool. The battery pack 10 may also power the first electric tool by being connected to the body 30. In this way, the versatility of the battery pack is achieved. The battery pack 10 is joined to the body 30 and carried by a user, reducing a force that a hand of the user needs to bear when the battery pack 10 is joined to the second electric tool. The configuration of the weight of the battery pack 10 and the body 30 allows the user to feel comfortable when the user wears the apparatus and allows more power to be supplied.

Figure 22:
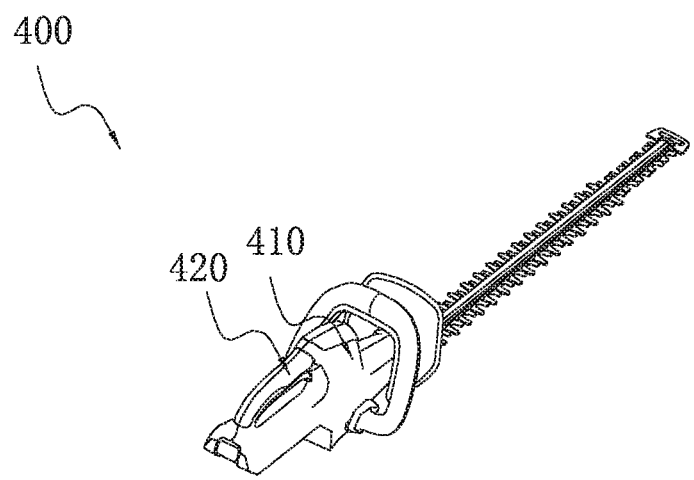
FIG. 22 is a schematic diagram of an exemplary pruner.

As shown in FIG. 22, a pruner 400 includes a motor 410, a housing 420 and a pruning blade.

The motor 410 drives the pruning blade. The housing 420 is provided with a joining portion. The battery pack 10 is joined to the joining portion to power the motor. The pruner 400 can serve as an electric tool of the backpack tool system 1000. The pruner 400 can serve as the second electric tool of the backpack tool system 3000.

Figure 23:
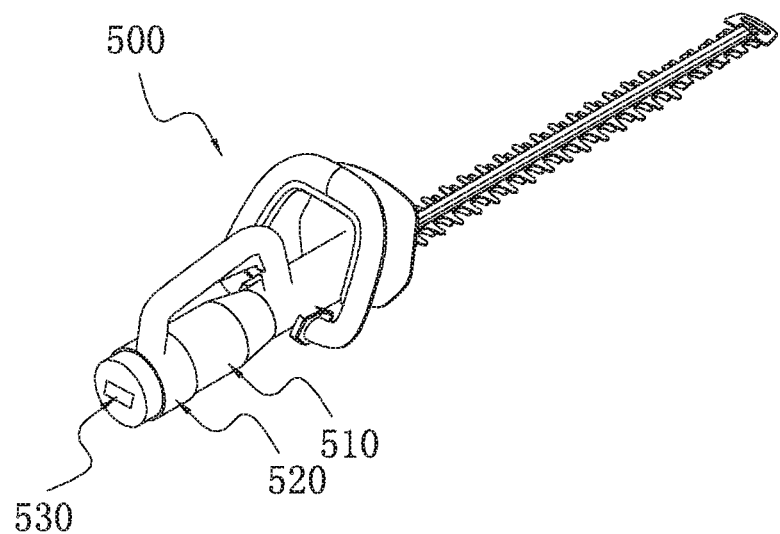
FIG. 23 is a schematic diagram of another exemplary pruner.

As shown in FIG. 23, a pruner 500 includes a motor 510, a housing 520 and a pruning blade.

The motor 510 drives the pruning blade. The housing 520 is provided with a tool electric input interface 530. The pruner 500 can serve as the electric tool of the backpack tool system 2000. The pruner 500 can serve as the first electric tool of the backpack tool system 3000.

Figure 24:
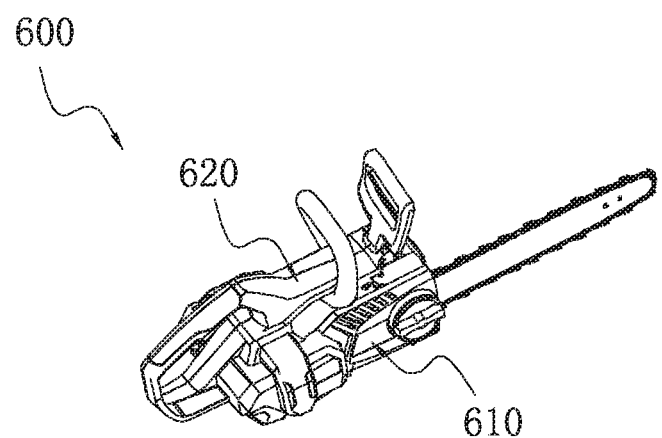
FIG. 24 is a schematic diagram of an exemplary chain saw.

As shown in FIG. 24, a chain saw 600 includes a motor 610, a housing 620 and a saw chain.

The motor 610 drives the saw chain. The housing is provided with a joining portion. The chain saw 600 can serve as an electric tool of a backpack tool system 100. The saw chain 600 can serve as a second electric tool of the backpack tool system 3000.

Figure 25:
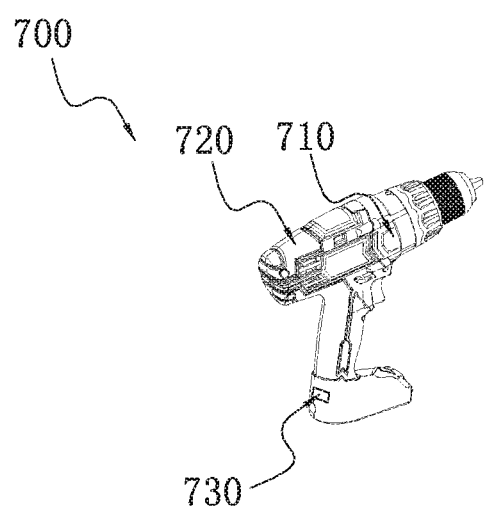
FIG. 25 is a schematic diagram of an exemplary electric drill.

As shown in FIG. 25, an electric drill 700 includes a motor 710, a housing 720 and a work head.

The motor 710 drives the work head to rotate. The work head is used for clamping a drill bit. The housing 720 is provided with a tool electric input interface 730. The electric drill 700 can serve as the electric tool of the backpack tool system 2000. The electric drill 700 can serve as the first electric tool of the backpack tool system 3000.

In other examples, the electric tool of the backpack tool system 1000, the electric tool of the backpack tool system 2000, and the first electric tool and the second electric tool of the backpack tool system 3000 may also be a grass trimmer, a mower, a snow plow, a reciprocating saw, a circular saw, etc.

The above illustrates and describes basic principles, main features and advantages of the present disclosure. It is to be understood by those skilled in the art that the above examples do not limit the present disclosure in any form, and all solutions obtained by means of equivalent substitution or equivalent transformation fall within the protection scope of any claim hereinafter presented.

What is claimed is:

1. A backpack power supply apparatus, comprising:
a battery pack for providing electric energy;
a body for supporting the battery pack, wherein the battery pack is detachably connected to the body, the body is at least partially symmetrical about a plane, and the body defines a height in a heightwise direction;
a wearable device connected to the body and wearable by a user to carry the body, wherein the wearable device comprises a strap, the strap comprises an upper end connected to an upper portion of the body, and the upper end of the strap applies a force to the body when the user wears the wearable device;
an electric energy transmission device electrically coupled to the battery pack for outputting the electric energy of the battery pack, wherein the electric energy transmission device is provided with a first electric energy output interface; and
a securing member for securing the first electric output interface,
wherein an included angle between a projection of a direction of the force on the plane and the heightwise direction is greater than or equal to 30 degrees and less than or equal to 50 degrees, and
wherein the securing member is secured to the wearable device or the battery pack, the electric energy transmission device comprises a cable, the first electric energy output interface is disposed at an end of the cable, the securing member is provided with a first securing slot for securing the cable and a second securing slot for securing the first electric energy output interface, and an opening of the second securing slot is larger than an opening of the first securing slot.

2. The backpack power supply apparatus of claim 1, wherein the body further defines a depth in a front-rear direction, the battery pack is connected to a rear portion of the body, a front portion of the body is provided with a back plate extending along the heightwise direction, and a projection of a center of gravity of an entirety formed of the battery pack and the body on the plane is between a projection of a straight line on which the force is located on the plane and a projection of the back plate on the plane.

3. The backpack power supply apparatus of claim 1, wherein the body further defines a depth in a front-rear direction, the battery pack is connected to a rear portion of the body, a front portion of the body is provided with a back plate extending along the heightwise direction, and a ratio of a distance from a center of gravity of an entirety formed of the battery pack and the body to the back plate to a length of the entirety formed of the battery pack and the body in the front-rear direction is greater than 0 and less than or equal to 0.85.

4. The backpack power supply apparatus of claim 1, wherein the wearable device comprises a back pad for contacting a back of the user and the back pad is slidably connected to the body along the heightwise direction.

5. The backpack power supply apparatus of claim 4, wherein the back pad is secured to the strap.

6. The backpack power supply apparatus of claim 5 further comprising a slider slidably connected to the body, wherein the back pad is secured to the slider, the body is provided with a guide slot, and the slider is provided with a protrusion sliding along the guide slot.

7. The backpack power supply apparatus of claim 1, wherein the battery pack is slidably connected to the body, a projection of the body on the plane is L-shaped, and a projection of the battery pack on the plane is located in an included angle region of the L-shaped projection of the body.

8. The backpack power supply apparatus of claim 1, wherein the body comprises a base for supporting the body and a guide portion for guiding the battery pack to slide relative to the body and along the heightwise direction and the base and the guide portion form an L shape.

9. The backpack power supply apparatus of claim 8, wherein two side stoppers protrude from the guide portion toward the battery pack and the two side stoppers are located on two sides of the battery pack respectively.

10. The backpack power supply apparatus of claim 1, wherein an opening of the first securing slot is smaller than a diameter of the cable.

11. The backpack power supply apparatus of claim 10, wherein the securing member comprises a securing member body and a clamping portion, the securing member body is secured to the strap, the clamping portion is provided with a first support arm and a second support arm, and the second securing slot is formed between the first support arm and the second support arm.

12. The backpack power supply apparatus of claim 11, wherein a first end of the second support arm is connected to the securing member body, a second end of the second support arm is provided with a second bending portion, and the first electric energy output interface is located between the securing member body and the second bending portion.

13. The backpack power supply apparatus of claim 12, wherein an included angle between the second bending portion and the second support arm is greater than 90 degrees and less than or equal to 135 degrees.

14. The backpack power supply apparatus of claim 11, wherein the securing member body and the clamping portion are integrally formed and the securing member body is provided with a mounting slot for securing the securing member to the strap.

15. The backpack power supply apparatus of claim 11, wherein the first securing slot and the second securing slot are located on a same side of the securing member body.

16. The backpack power supply apparatus of claim 10, wherein an area of a projection of the first securing slot is smaller than an area of a projection of the second securing slot.

17. The backpack power supply apparatus of claim 10, wherein the opening of the second securing slot is larger than the diameter of the cable.

18. The backpack power supply apparatus of claim 1, wherein the securing member is located on a front of a body of the user and the battery pack is located on a rear of the body of the user when the user wears the wearable device.

19. A backpack tool system, comprising:
a battery pack for providing electric energy;
a body for carrying the battery pack, wherein the battery pack is detachably connected to the body, the body is at least partially symmetrical about a plane, and the body defines a height in a heightwise direction;
a wearable device connected to the body and wearable by a user to carry the body, wherein the wearable device comprises a strap, the strap comprises an upper end connected to an upper portion of the body, and the upper end of the strap applies a force to the body when the user wears the wearable device; and
an electric tool comprising a motor and a housing for accommodating at least part of the motor;
wherein an included angle between a projection of a direction of the force on the plane and the heightwise direction is greater than or equal to 30 degrees and less than or equal to 50 degrees, and the battery pack is detachably connected to the housing and powers the motor.

20. A backpack tool system, comprising:
a backpack power supply apparatus;
a first electric tool; and
a second electric tool,
wherein the backpack power supply apparatus comprises:
a battery pack;
a body for carrying the battery pack, wherein the battery pack is detachably connected to the body; and
a wearable device connected to the body and wearable by a user to carry the body,
wherein the wearable device comprises a strap,
wherein the body is provided with a first electric energy output interface and a first electric energy input interface, the battery pack is provided with a second electric energy output interface for outputting electric energy, the first electric energy input interface is configured to match the second electric energy output interface, and the first electric energy output interface is electrically connectable to the first electric energy input interface;
the first electric tool comprises:
a first motor; and
a second electric energy input interface configured to match the first electric energy output interface;
the second electric tool comprises:
a second motor; and
a joining portion for joining the battery pack to the second electric tool, wherein the battery pack is detachably joined to the joining portion, the joining portion is provided with a third electric energy input interface, and the third electric energy input interface is configured to match the second electric energy output interface,
wherein, when the battery pack is joined to the joining portion, the third electric energy input interface is connected to the second electric energy output interface, and the battery pack powers the second motor, when the battery pack is joined to the body, the first electric energy input interface is connected to the second electric energy output interface, the second electric energy input interface is connected to the first electric energy output interface, and the battery pack powers the first motor, a total weight of the battery pack and the body is greater than a weight of the first electric tool, and the total weight of the battery pack and the body is greater than or equal to 3 kg and less than or equal to 10 kg, and
wherein the body comprises a cable, an end of the cable is provided with the first electric energy output interface, the backpack power supply apparatus further comprises a securing member provided with a first securing slot for securing the cable and a second securing slot for securing the first electric energy output interface, the securing member is secured to the strap, and an opening of the second securing slot is larger than an opening of the first securing slot.

21. The backpack tool system of claim 20, wherein the body defines a depth in a front-rear direction, the battery pack is connected to a rear portion of the body, a front portion of the body is provided with a back plate extending along a heightwise direction, and a ratio of a distance from a center of gravity of an entirety formed of the battery pack and the body to the back plate to a length of the entirety formed of the battery pack and the body in the front-rear direction is greater than 0 and less than or equal to 0.85.

22. The backpack tool system of claim 20, wherein the wearable device comprises a back pad for contacting a back of the user and the back pad is slidably connected to the body along a heightwise direction.

23. The backpack tool system of claim 22, wherein the back pad is secured to the strap.

24. The backpack tool system of claim 23, wherein the backpack power supply apparatus further comprises a slider slidably connected to the body, wherein the back pad is secured to the slider, the body is provided with a guide slot, and the slider is provided with a protrusion sliding along the guide slot.

25. The backpack tool system of claim 20, wherein the battery pack is slidably connected to the body, a projection of the body on a plane is L-shaped, and the battery pack is located in an included angle region of the L-shaped projection.

26. The backpack tool system of claim 20, wherein the body comprises a base for supporting the body and a guide portion for guiding the battery pack to slide relative to the body and along a heightwise direction and the base and the guide portion form an L shape.

27. The backpack tool system of claim 26, wherein two side stoppers protrude from the guide portion toward the battery pack and the two side stoppers are located on two sides of the battery pack respectively.

28. The backpack tool system of claim 20, wherein a safety switch is electrically connected between the first electric energy output interface and the first electric energy input interface, the safety switch has a first state in which the first electric energy output interface is connected to the first electric energy input interface and a second state in which the first electric energy output interface is disconnected from the first electric energy input interface, the safety switch is in the first state when the battery pack is joined to the body, and the safety switch is in the second state when the battery pack is separated from the body.

29. The backpack tool system of claim 28, wherein the body further comprises a contacting member for contacting the battery pack, wherein the contacting member has a first position and a second position, the contacting member is located at the first position when the battery pack is joined to the body, and the contacting member is located at the second position when the battery pack is separated from the body, and a biasing member for applying a force to the contacting member such that the contacting member moves from the first position to the second position and the battery pack is separated from the body, wherein the contacting member triggers the safety switch such that the safety switch is in the first state when the contacting member is in the first position, and the safety switch is in the second state when the contacting member is in the second position.

\* \* \* \* \*